United States Patent [19]

Vredenburg, Sr.

[11] 4,236,308

[45] Dec. 2, 1980

[54] SELF-CLEANING TREE GIRDLING DEVICE

[76] Inventor: Edric W. Vredenburg, Sr., P.O. Box 135, Fortine, Mont. 59918

[21] Appl. No.: 41,600

[22] Filed: May 23, 1979

[51] Int. Cl.³ .............................................. A01G 3/03
[52] U.S. Cl. ........................................ 30/121; 30/317
[58] Field of Search .................................. 30/121, 317

[56] References Cited

U.S. PATENT DOCUMENTS

| 278,686 | 6/1883 | Daigneau | 30/121 |
| 973,494 | 10/1910 | Friedlund | 30/121 |
| 2,180,150 | 11/1939 | Knight | 30/121 |
| 2,552,652 | 5/1951 | Stasiek | 30/121 |

FOREIGN PATENT DOCUMENTS 419202  8/1974  U.S.S.R. .................................. 30/121

*Primary Examiner*—Othell M. Simpson
*Assistant Examiner*—J. T. Zatarga
*Attorney, Agent, or Firm*—Robert H. Eckhoff

[57] ABSTRACT

In my co-pending application Ser. No. 949,811 of Oct. 10, 1978, now U.S. Pat. No. 4,188,718 I disclosed an improved device for "girdling" trees. That device effectively removes a complete circular band of bark and all that underlies the bark to the central portion of the tree so that fluid cannot pass from the root system of the tree to the upper portion of the tree whereby, with the elimination of such fluid transmission, the tree dies. In many areas, such girdling is practiced widely as a method of improving the ecology of the area for the dead trees are readily removed by being pushed over by a bulldozer. This invention relates to a construction of such a girdling device whereby the bark or other material caught between the cutting element during girdling can be readily removed.

2 Claims, 6 Drawing Figures

SELF-CLEANING TREE GIRDLING DEVICE

SUMMARY OF THE INVENTION

In general it is the broad object of the present invention to provide an improved form of tree girdling device which during manipulation can be readily cleared of the bark and other residues removed during such girdling operation.

DESCRIPTION OF THE PREFERRED EMBODIMENT

Figure 1:
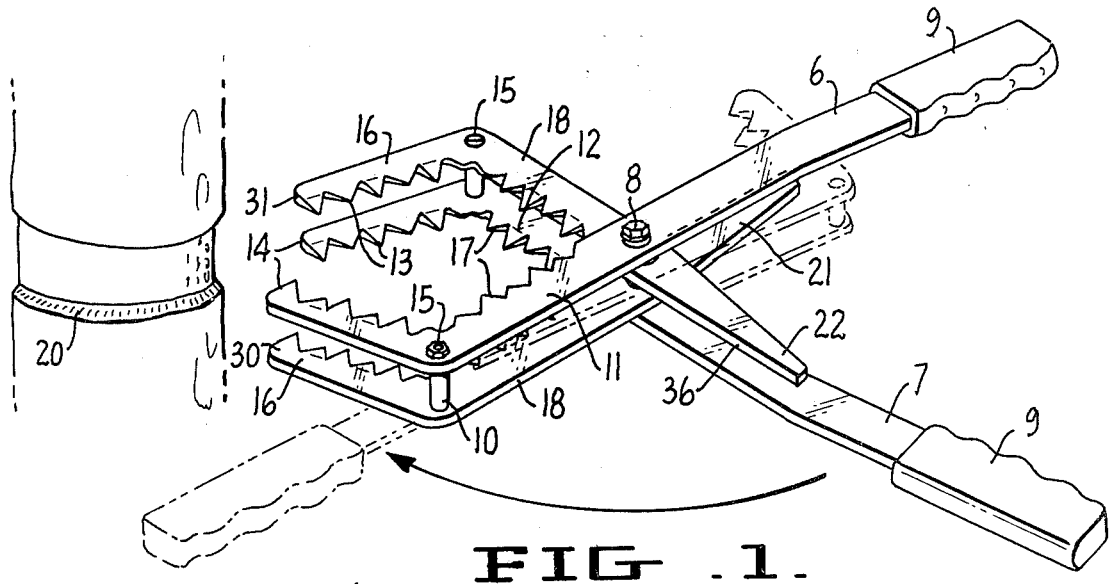
FIG. 1 is a perspective view showing the tree girdling device after use as a girdling device.
Figure 2:
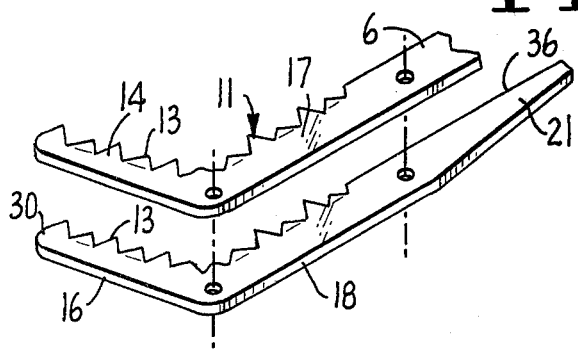
FIG. 2 is a fragmentary perspective view of tree girdling elements.
Figure 3:
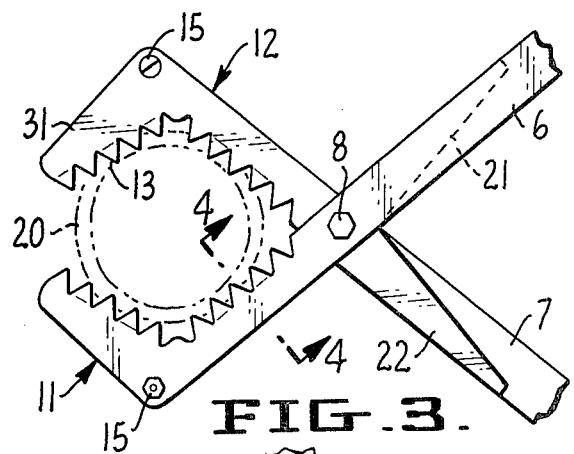
FIG. 3 is a plan view showing the girdling device in use.
Figure 4:
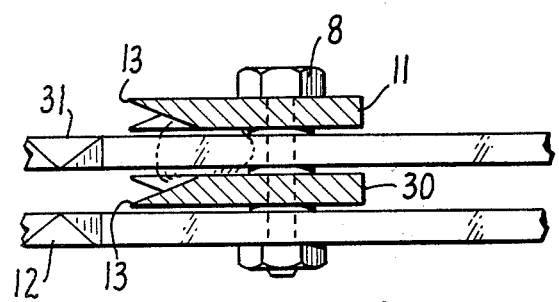
FIG. 4 is a section along the line 4—4 in FIG. 3.

Referring to the drawings, the device includes opposite lever members 6 and 7 pivoted upon one another by the nut and bolt 8. Each of the levers 6 and 7 includes a handle portion 9 ate one end thereof. The forward ends of the levers 6 and 7, designated as blade-like ends 11 and 12, have spaced blade-like portions 30 and 31 similarly shaped as such forward ends 11 and 12. Such portions are joined to the forward ends 11 and 12 in a spaced relationship by tubular spacers 10 and a bolt and nut assembly 15. Each of the aforementioned forward ends 11 and 12 and portions 30 and 31 includes a plurality of teeth 13. The teeth vary in depth so that the cutting action of the teeth on the bark varies. Each of the forward ends 11 and 12 and each of the portions 30 and 31 is bent upon itself to provide, respectively, a forward portion 14 and 16 and a rearward portion 17 and 18. Portions 14 and 17 and 16 and 18 provide, in effect, a receptacle so that they may be placed about a tree in an encircling manner as in FIG. 3.

In use, an operator grasps the handles 9 and moves the handles apart at first and then retracts them into encircling engagement with a tree. Upon moving the handles toward one another, the tree is gripped and the tool is in cutting engagement with each of the teeth 13 extending into the bark. Rotation of the device about the tree causes the teeth 13 to cut through the bark 20 on the surface of the tree to remove the outer or cork layer of the bark on the tree. Stated differently, rotation of the device enables the teeth 13 to remove the cortical parenchyma, epidermis, pericycle and phloem, thus effectively girdling the tree. The results of effective girdling are well-known for it prevents the passage of fluid from the root system of the tree with the result that the portion of the tree above the girdle, lacking any sustaining fluid, dries and dies in the absence of the life sustaining fluid.

Figure 6:
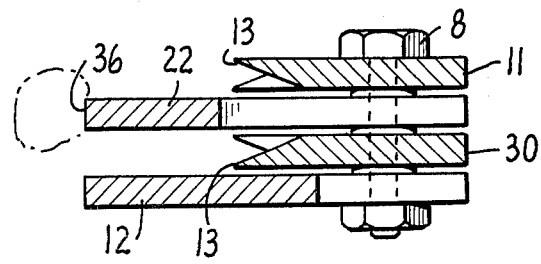
FIG. 6 is a section taken along the line 6—6 in FIG. 5.
Figure 5:
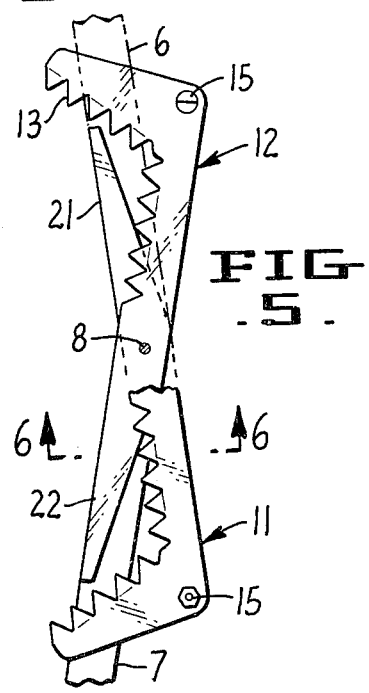
FIG. 5 is a view showing the girdling device in position for removing bark and other material trapped between the cutters.

During such girdling use, the space between the upper and lower ends 11 and 12 and the portions 30 and 31 will become filled with the material removed in the girdling operation. The presence of this material will interfere and reduce the effectiveness of the girdling device in a subsequent girdling operation on another tree. Therefore, in accordance with this invention, I provide rearwardly extending extensions 21 and 22 on each of portions 30 and 31 which are movable between the spaced upper and lower blades. When the handles 6 and 7 are moved to a position in which they are in a common line as in FIG. 6, the extensions 21 and 22 are moved to eject any material lodged between the upper and lower ends 11 and 12 and the portions 30 and 31.

Attention is called to the fact that each of the rearwardly extending extensions 21 and 22 on each of portions 30 and 31 has a flat leading face 36 on the leading edge of the extension as each extension is advanced to enter and move beyond the spaced end 11 and portion 30 and end 12 and portion 31 while the rear face of each extension is tapered toward the free end. The purpose of having a flat leading face and a trailing tapered rear face is to the end that the flat face, upon entering between the spaced upper and lower blades, will eject material forcefully while, upon retraction of each of the extensions away from the spaced upper and lower blades, the tapered face will force any material still retained between the upper and lower blades to slide along the tapered face and so be readily ejected from between the upper and lower blades.

I claim:

1. A tree girdling device having a pair of dual levers hingeably connected together by a hinge located intermediate the ends of said dual levers, each dual lever having a pair of levers in spaced relation with each other and connected together by a connecting means and having a handle at one end of one lever of each pair of levers for moving said dual levers about the hinge, said levers having their other ends formed with tree encircling elements, each tree encircling element having a first portion continuing the lever with a second terminal portion extending at approximately 90° to the first portion and toward an opposite like portion on the other lever, each of the portions having cutter elements to cut the bark of a tree, the other lever of each pair of levers having a rearwardly extending portion having a length less than the distance between said connecting means and said hinge, the rearwardly extending portion of one dual lever being movable between the spaced levers of the other dual lever to remove any material held between the spaced levers of said dual levers.

2. A tree girdling device as in claim 1 wherein in a closed position each of said rearwardly extending portions has one face presented toward the other rearwardly extending portion and another face presented away from the other rearwardly extending portion, said another face being flat and said one face being arcuate.

* * * * *